(12) United States Patent
Asada

(10) Patent No.: US 7,750,602 B2
(45) Date of Patent: Jul. 6, 2010

(54) METHOD AND APPARATUS FOR MANAGING CHARGE/DISCHARGE CURRENT OF ON-VEHICLE BATTERY TO CONTROL ON-VEHICLE GENERATOR IN CONSIDERATION OF OFFSET OF CHARGE/DISCHARGE CURRENT

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 311 days.

(21) Appl. No.: 11/889,287

(22) Filed: Aug. 10, 2007

(65) Prior Publication Data

US 2008/0036423 A1 Feb. 14, 2008

(30) Foreign Application Priority Data

Aug. 10, 2006 (JP) ............................. 2006-218121

(51) Int. Cl.
H02J 7/00 (2006.01)
(52) U.S. Cl. ........................ 320/128; 320/134; 320/162; 322/27; 322/28
(58) Field of Classification Search ................. 320/132, 320/134, 149, 128, 162; 426/324, 335; 322/27, 322/28, 37
See application file for complete search history.

(56) References Cited

U.S. PATENT DOCUMENTS

| | | | |
|---|---|---|---|
| 6,573,688 B2 * | 6/2003 | Nakanishi | 320/135 |
| 6,979,977 B2 * | 12/2005 | Amano et al. | 320/104 |
| 7,180,272 B2 * | 2/2007 | Okahara et al. | 322/37 |
| 7,294,991 B2 * | 11/2007 | Kimura et al. | 322/37 |
| 7,525,286 B2 * | 4/2009 | Wang | 320/133 |

FOREIGN PATENT DOCUMENTS

| | | |
|---|---|---|
| JP | A 2003-035176 | 2/2003 |
| JP | A 2003-209935 | 7/2003 |
| JP | A 2003-331931 | 11/2003 |
| JP | A 2004-015963 | 1/2004 |
| JP | A 2005-100682 | 4/2005 |
| JP | A 2005-348526 | 12/2005 |

OTHER PUBLICATIONS

Machine Translation for JP 2005-100682 A.*

* cited by examiner

*Primary Examiner*—Edward Tso
*Assistant Examiner*—Ramy Ramadan
(74) *Attorney, Agent, or Firm*—Oliff & Berridge, PLC

(57) ABSTRACT

An apparatus is provided to manage a charge/discharge current of an on-vehicle battery. The apparatus comprises a detecting unit detecting an actual amount of the charge/discharge current and a receiving unit receiving information indicating generating operations of an on-vehicle generator. The apparatus also comprises a control unit controlling the generating operations of the generator so that the charge/discharge current keeps a given value specified, on the basis of the detected actual the charge/discharge current and the received information. The apparatus also comprises determining and setting units. The determining unit determines whether a voltage of the battery satisfies a given condition for the voltage, by monitoring the voltage in a state where the generating operation of the generator is controlled. The setting unit sets, as an amount of offset of the charge/discharge current, a charge/discharge current detected when it is determined that the voltage of the battery satisfies the given condition.

8 Claims, 5 Drawing Sheets

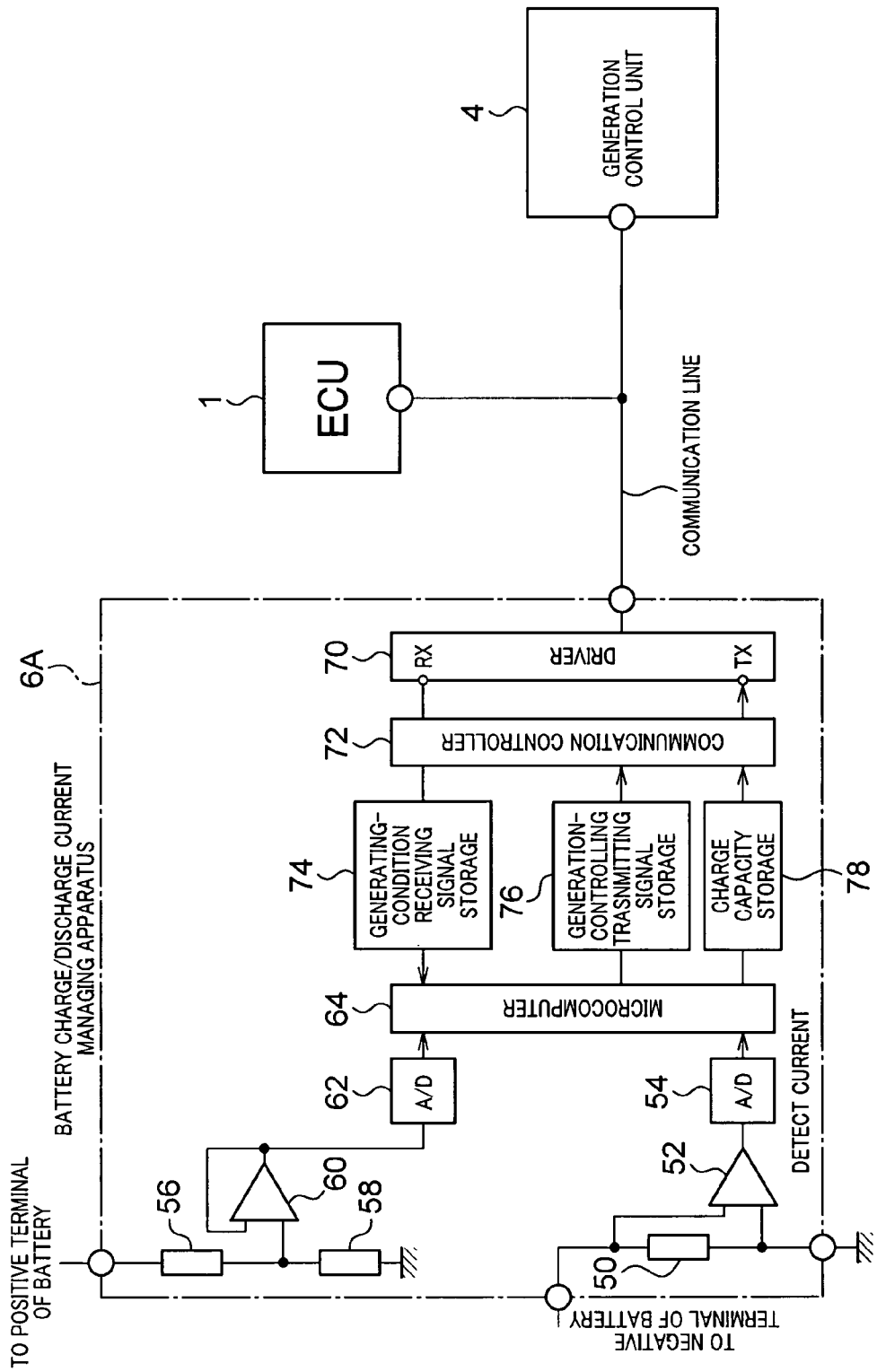

METHOD AND APPARATUS FOR MANAGING CHARGE/DISCHARGE CURRENT OF ON-VEHICLE BATTERY TO CONTROL ON-VEHICLE GENERATOR IN CONSIDERATION OF OFFSET OF CHARGE/DISCHARGE CURRENT

CROSS-REFERENCE TO RELATED APPLICATION

This application is based on and claims the benefit of priority from earlier Japanese Patent Application No. 2006-218121 filed Aug. 10, 2006, the description of which is incorporated herein by reference.

BACKGROUND OF THE INVENTION

1. Technical Field of the Invention

The present invention relates to a method and an apparatus for managing a charge/discharge current of a battery loaded, for example, on a passenger car and a truck, and more particularly, to the managing apparatus in order to control an on-vehicle generator in consideration of an offset of the charge/discharge current

2. Related Art

Measurement of charge/discharge current of a battery loaded on a vehicle (hereinafter referred to just as a "battery") enables control of electric power generation conditions of a generator loaded on the vehicle (hereinafter referred to just as a "generator") so as not to cause overdischarge or overcharge of the battery. A measurement value derived from a current sensor after measurement of a charge/discharge current of a battery generally includes an error due to offset of the current (i.e., an offset error).

For coping with such an offset error, Japanese Patent Application Laid-Open No. 2005-100682, for example, discloses a battery charge/discharge current measuring apparatus which is able to determine the offset error. This battery charge/discharge current measuring apparatus controls the amount of power generation of the generator so that a measurement value derived from the current sensor may substantially become zero. Then, the voltage variation of the battery after lapse of a predetermined period T is measured. When the amount of variation of the battery voltage is within a predetermined range, the measurement value derived from the current sensor after lapse of the predetermined period T is determined as being an offset error D (i.e., an amount of offset of the charge/discharge current).

The technique disclosed in Japanese Patent Application Laid-Open No. 2005-100682, however, has suffered from the following drawbacks in observing a zero level of the current measured by the current sensor:

(1) In making a zero-level determination by a control unit which is located apart from the current sensor, an output signal of the current sensor is superposed by the ignition noise, because the battery is generally located in an engine room, thus disabling stable measurement of the current.

(2) The generated voltage of the generator is controlled to make a determination of an offset error based on the zero-level battery voltage variation. However, where the output current is varied caused by variations in the number of revolutions and the excitation current of the generator, the variation in the output current may be erroneously determined as being the error of the current sensor.

(3) Blind determination of the offset error under the unstable measuring conditions may make the offset error indefinite, which in turn may disturb the capacity control based on current integration.

SUMMARY OF THE INVENTION

The present invention has been made in light of the drawbacks enumerated above, and has as its object to provide a battery charge/discharge current managing apparatus, which enables stable measurement by reducing the influence of noise and thus enables stable and accurate capacity control based on current integration.

In order to take measures for the drawbacks mentioned above, the present invention provides, as a basic structure thereof, an apparatus managing a charge/discharge current of a battery mounted on a vehicle, comprising: a detecting unit that detects an actual amount of the charge/discharge current; a receiving unit that detects information indicative of an generating operation of a generator mounted on the vehicle; a control unit that controls the generating operation of the generator so that the charge/discharge current of the battery keeps a given value specified for the charge/discharge current, on the basis of the detected actual amount of the charge/discharge current and the received information indicative of the generating operation of the generator; a determining unit that determines whether or not a voltage of the battery satisfies a given condition for the voltage, by monitoring the voltage in a state where the generating operation of the generator is controlled by the control unit; and a setting unit that sets, as an amount of offset (i.e., an offset error) of the charge/discharge current, a charge/discharge current detected by the detecting unit when it is determined by the determining unit that the voltage of the battery satisfies the given condition.

Being provided with the controlling unit in the battery charge/discharge current managing apparatus, influences of noise can be drastically reduced, which noise has conventionally influenced the communication associated with the charge/discharge current of the battery, made with the controlling unit located apart from the apparatus. In particular, the presence of such noise may necessitate the use of a filter for removing high-frequency components. Use of the filter, however, may become the cause of the occurrence of an offset error. Thus, the remarkable reduction of the noise, as mentioned above, may eliminate the use of the filter, or may allow use of a filter of a simplified structure, leading to the reduction of the offset error, per se. In this way, reduction in the influences of the noise may enable stable measurement of the offset error. At the same time, taking into account of the offset error, high-precision measurement may be enabled for the battery charge/discharge current.

It is preferable that the information indicative of the generating operation of the generator is the number of revolutions of the generator and the determining unit is configured to determine, as the given condition for the voltage, whether or not the number of revolutions is within a given range of revolutions.

Determination of the offset error while the number of revolutions of the generator is stabilized, may prevent the influences brought about by the variation in the amount of generation, which variation occurs with the variation in the number of revolutions of the generator. This may lead to determining the offset error with high precision.

It is preferable that the information indicative of the generating operation of the generator is an excitation current supplied to the generator and the determining unit is configured to determine, as the given condition for the voltage, whether or not the excitation current is within a given range of the excitation current.

Measurement of the offset error while the excitation current of the generator is stabilized, may prevent the adverse effect of the variation in the amount of generation, which variation occurs with the variation in the excitation current of the generator. This may lead to determining the offset error with high precision.

It is preferable that the control unit is configured to control, as the generating operation of the generator, an excitation current to the generator so that an output current from the generator is variably controlled.

Controlling the excitation current for the purpose of making the output current of the generator variable, may further stabilize control for achieving the predetermined reference value, than the conventional technique of controlling the generated voltage for achieving the same purpose. In particular, input impedance of the battery is as small as several milliohms, which may unavoidably cause the charge/discharge current to be varied with a small change of the voltage. However, giving variability to the output current of the generator by controlling the excitation current, may allow the control of the charge/discharge current of the battery with more stable manner.

It is preferable that the detecting unit comprises a resistor inserted in series into a path through which the charge/discharge current of the battery is supplied and is configured to detect the amount of the charge/discharge current based on a voltage across the resistor.

There are other methods for measuring current, including a method for measuring current based on the variation of magnetic field. Comparing with this method, the method using the current measuring resistor may not be affected by the terrestrial magnetism. Thus, the adverse effect of the disturbance can be removed to enable determination of an offset error with high precision.

It is preferable that the resistor is electrically connected with a negative terminal of the battery and is electically connected to the ground.

This may enable measurement of the charge/discharge current of the battery with the ground potential as a reference. Accordingly, the battery charge/discharge current managing apparatus as a whole can be operated with the ground potential as a reference, whereby the operation can be stabilized compared with the case of the ground float.

It is preferable that the receiving unit is configured to receive the information indicative of the generating operation of the generator from an external apparatus on digital communication.

This can eliminate the influences of the ignition noise, for example, so that stable conditions of generation of the generator can be reliably determined.

It is preferable that the receiving unit is configured to receive the information at intervals which are equal to or less than approximately 1/10 of a time constant of a rotator of the generator.

Therefore, the generation conditions of the generator can be detected at a speed sufficiently higher than the change of the generation conditions, leading to more reliable determination on the stable conditions of generation of the generator.

It is preferable that the apparatus further comprises an estimating units that estimates a capacity of the battery based on the actual amount of the charge/discharge current detected by the detecting unit and the offset of the charge/discharge current set by the setting unit; and a transmitting unit that transmits information indicative of the estimated capacity of the battery to an external apparatus.

Thus, elimination of noise influences for determination of an offset error may enable stable and high-precision capacity control based on the current integration.

BRIEF DESCRIPTION OF THE DRAWINGS

In the accompanying drawings:

FIG. 6 is a block diagram illustrating a modification of the battery charge/discharge current managing apparatus.

DETAILED DESCRIPTION OF THE PREFERRED EMBODIMENTS

With reference to the accompanying drawings, hereinafter is described an embodiment of a battery charge/discharge current managing apparatus to which the present invention is applied.

Figure 1:
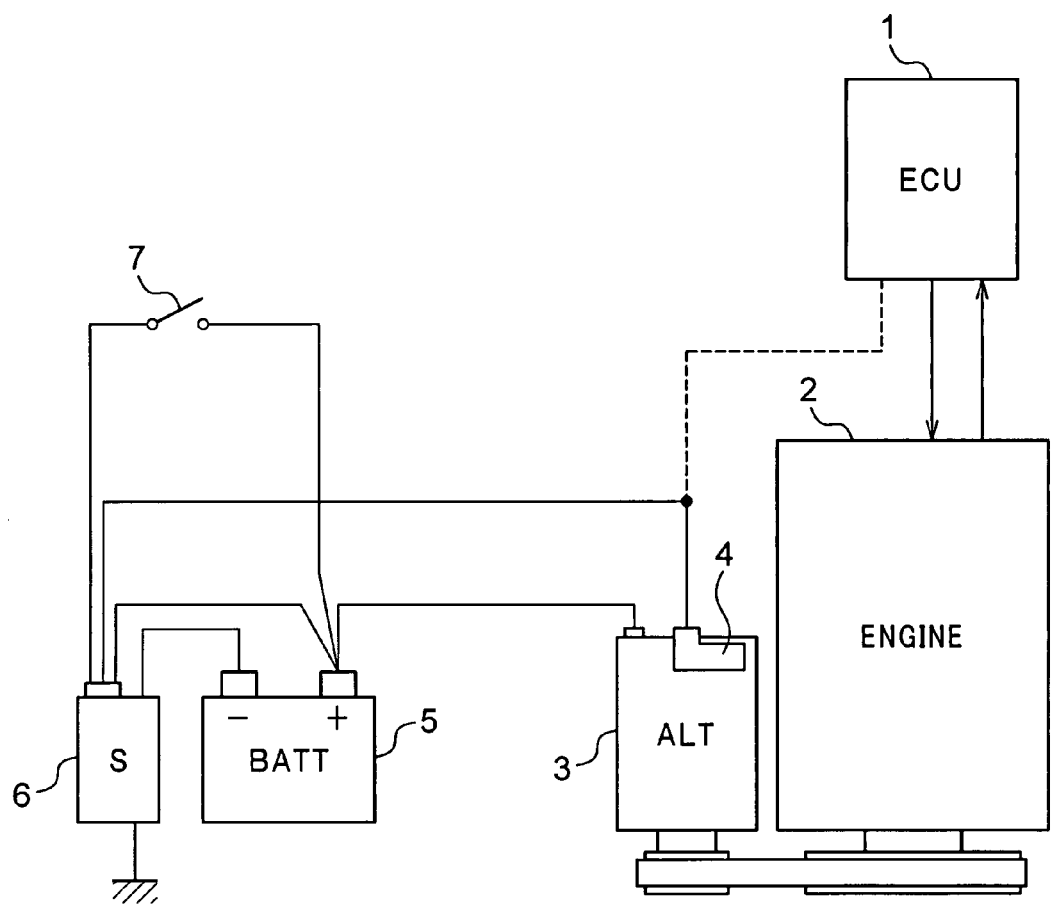
FIG. 1 is a block diagram illustrating a general configuration of a charge system including a battery charge/discharge current managing apparatus according to an embodiment of the present invention.

FIG. 1 is a block diagram illustrating a general configuration of a charge system including a battery charge/discharge current managing apparatus according to the embodiment of the present invention. The charge system shown in FIG. 1 includes an ECU (electronic control unit) 1 for an engine 2, a generator (ALT) 3, a battery (BATT) 5, a battery charge/discharge current managing apparatus (S) 6, and a key switch 7.

The ECU 1 is an external control unit for performing revolution control of the engine 2, during which time the revolution condition of the engine 2 is monitored. The generator 3 generates electric power by being rotated and driven by the engine 2 through a belt to supply charging electric power to the battery 5 or operation electric power to various electric loads (not shown). The generator 3 is incorporated with a generation control unit 4 for controlling output voltage with the adjustment of the excitation current. The battery charge/discharge current managing apparatus 6 is located proximate to the battery 5 (fixed to a part of a casing of the battery 5, for example) to perform, for example, measurement of charge/discharge current of the battery 5, measurement of an offset error (i.e., an amount of offset of the charge/discharge current), and generation control for the generator 3.

Figure 2:
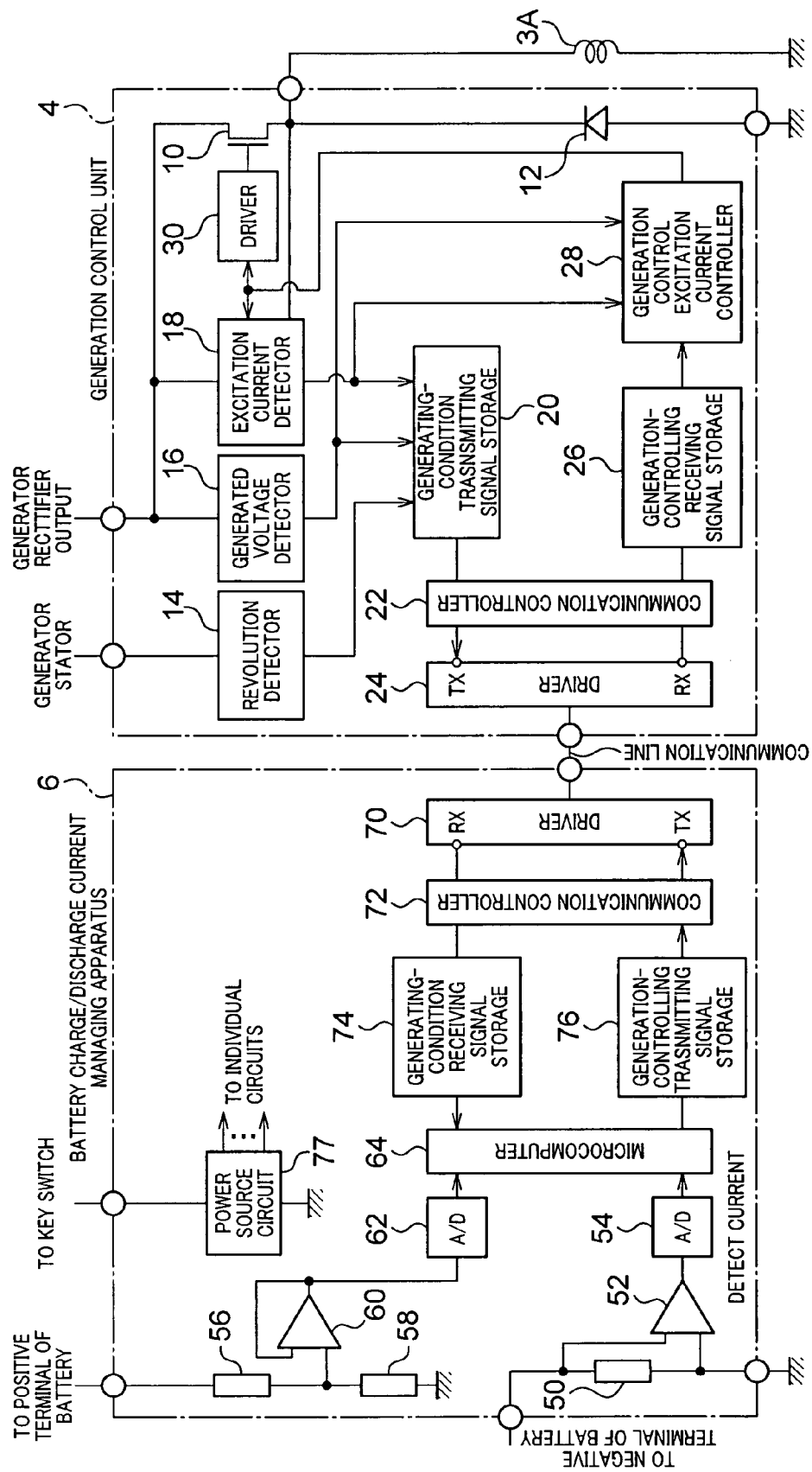
FIG. 2 is a block diagram illustrating a detailed configuration of the battery charge/discharge current managing apparatus and an on-vehicle generation control unit.

FIG. 2 is a block diagram illustrating a detailed configuration of the battery charge/discharge current managing apparatus 6 and the generation control unit 4. As shown in FIG. 2, the generation control unit 4 includes a power transistor 10, a recirculation diode 12, a revolution detector 14, a generated voltage detector 16, an excitation current detector 18, a generating-condition transmitting signal storage 20, a communication controller 22, a driver 24, a generation-controlling receiving signal storage 26, excitation current controller 28 and a driver 30.

The power transistor 10 is connected in series to an excitation winding 3A in the generator 3, which, when turned on, supplies excitation current to the excitation winding 3A. The recirculation diode 12 is connected in parallel to the excitation winding 3A, for recirculation of the excitation current that flows through the excitation winding 3A when the power transistor 10 is turned off.

The revolution detector 14 detects the number of revolutions of the generator 3. The number of revolutions of the generator 3 is detected, for example, by monitoring the frequency of phase voltage that appears at a phase winding structuring a stator winding of the generator 3. The generated voltage detector 16 detects output terminal voltage of the generator 3 as being the generated voltage. The excitation current detector 18 detects the excitation current that passes through the excitation winding 3A. For example, an on/off state of the power transistor 10 is monitored, and based on this on/off state and the generated voltage, the excitation current is calculated.

The generating-condition transmitting signal storage 20 stores generating-condition transmitting signals containing detection values of the number of revolutions, generated voltage, and excitation current detected by the revolution detector 14, the generated voltage detector 16 and the excitation current detector 18, respectively. The communication controller 22 carries out modulation processing by converting the generating-condition transmitting signals into a predetermined digital-communication format. The modulated signals (digitally modulated signals) are transmitted to the battery charge/discharge current managing apparatus 6 from the driver 24 through a communication line.

The driver 24 mentioned above also has a function of serving as a receiver for receiving the digitally modulated signals transmitted from the battery charge/discharge current managing apparatus 6 through the communication line. Also, the communication controller 22 mentioned above has a function of performing demodulation processing for the digitally modulated signals received by the driver 24. Generation-controlling transmitting signals obtained by the demodulation processing are stored in the generation-controlling receiving signal storage 26. The excitation current controller 28 performs an operation for effecting control, by which the generated voltage may agree with a predetermined adjustment voltage or that the excitation current may agree with a predetermined adjustment current. The excitation current controller 28 transmits a driving signal needed for this control to the driver 30. The driver 30 then drives the power transistor 10 in response to the driving signal transmitted from the controller 28.

As shown in FIG. 2, the battery charge/discharge current managing apparatus 6 includes a shunt resistor 50, amplifiers 52, 60, analogue/digital (A/D) converters 54, 62, resistors 56, 58, a microcomputer 64, a driver 70, a communication controller 72, a generating-condition receiving signal storage 74, a generation-controlling transmitting signal storage 76 and a power source circuit 77. The power source circuit 77 starts operation when the key switch 7 is turned on and supplies electric power necessary for the operation of the individual circuits.

The shunt resistor 50 serves as a resistor for measuring charge/discharge current of the battery 5, with its one end being connected to a negative terminal of the battery 5 and the other end being grounded. The amplifier 52 is a differential amplifier, for example, for amplifying voltage across the ends of the shunt resistor 50. The amplified voltage is digitally converted by the A/D converter 54 and inputted to the microcomputer 64.

The resistors 56, 58 constitute a partial pressure circuit for detecting the terminal voltage (battery voltage) of the battery 5. One end of the partial pressure circuit is connected to a positive terminal of the battery 5 and the other end is grounded. The amplifier 60 is an operational amplifier, for example, that functions as a buffer being connected to the output side of the partial pressure circuit consisting of the resistors 56, 58. The output voltage of the amplifier 60 (which voltage is equal to the partial pressure voltage appearing at the connections of the resistors 56, 58 in the configuration shown in FIG. 2) is digitally converted by the A/D converter 62 and inputted to the microcomputer 64.

The driver 70 and the communication controller 72 are provided for transmitting/receiving signals between themselves and the generation control unit 4 through the communication line. The driver 70 and the communication controller 72 operate basically in the same manner as the driver 24 and the communication controller 22 provided inside the generation control unit 4. That is, the driver 70 receives the digitally modulated signals (generating-condition transmitting signals) transmitted from the generation control unit 4 through the communication line. The communication controller 72 then performs demodulation processing for the received signals, whereby the resultant generating-condition receiving signals are stored in the generation condition receiver storage 74. Also, upon storage of the generation-controlling transmitting signals outputted from the microcomputer 64 in the generation-controlling transmitting signal storage 76, the communication controller 72 converts the generation-controlling transmitting signals into a predetermined digital-communication format to thereby perform modulation processing. The modulated signals (digitally modulated signals) are then transmitted to the generation control unit 4 from the driver 70 through the communication line.

The shunt resistor 50, the amplifier 52 and the A/D converter 54 correspond to the charge/discharge current measuring unit. The driver, the communication controller 72 and the generating-condition receiving signal storage 74 correspond to the receiving unit. The microcomputer 64 corresponds to both the generation controlling unit and the offset error determining unit.

Figure 3:
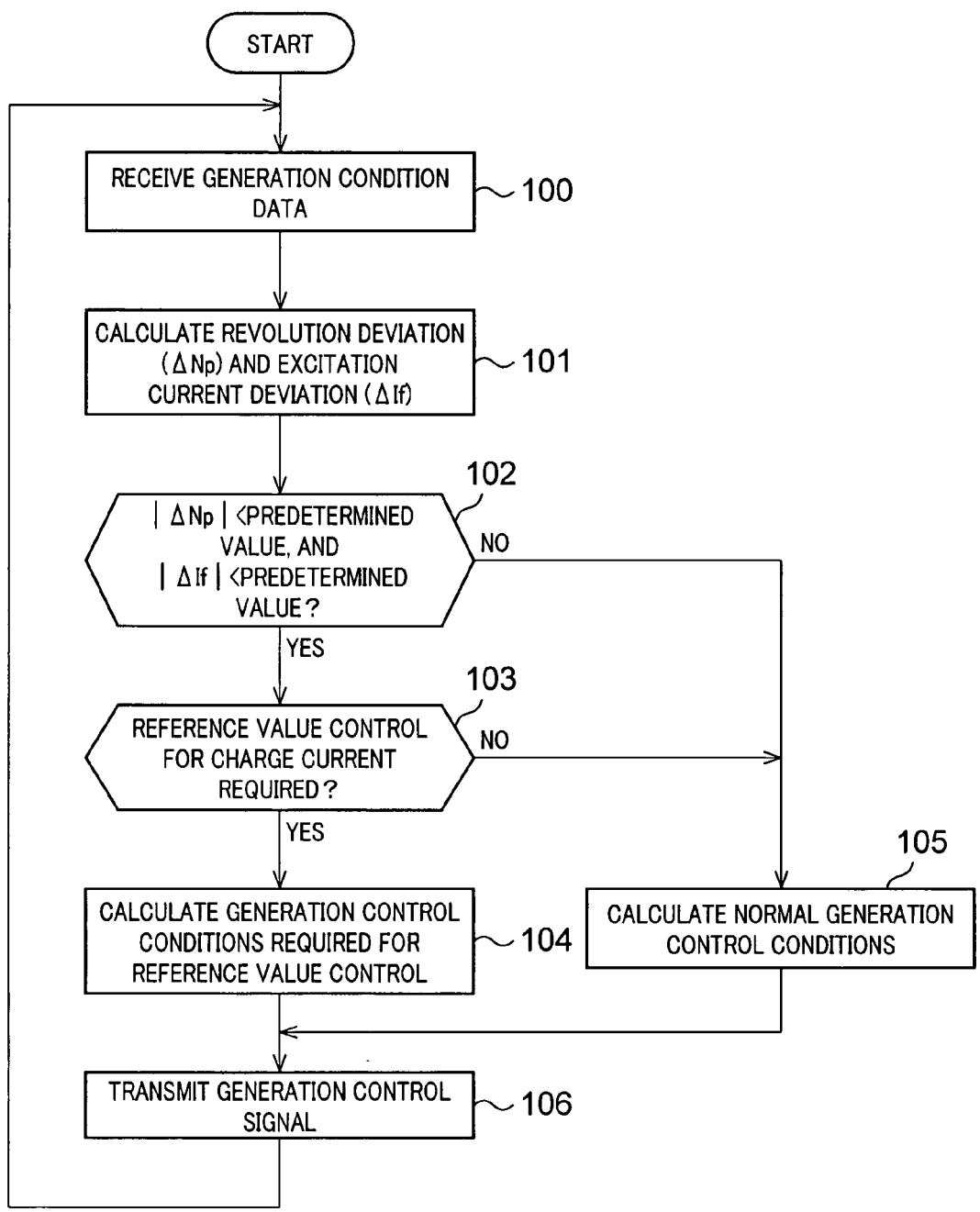
FIG. 3 is a flow diagram illustrating an operation procedure of the battery charge/discharge current managing apparatus.

The charge/discharge current managing apparatus 6 and the generation control unit 4 of the present embodiment have the configurations as described above. The description hereinafter is focused on the operation of these components. FIG. 3 is a flow diagram illustrating an operation procedure of the battery charge/discharge current managing apparatus 6. The operation procedure is repeated at an interval substantially one tenth of the time constant of the rotor of the generator 3.

The driver 70 receives the generating-condition transmitting signals transmitted from the generation control unit 4. The signals are subjected to the predetermined demodulation processing performed by the communication controller 72, so that the data indicating the generation condition of the generator 3 are stored in the generating-condition receiving signal storage 74 (step 100). The generation conditions include, for example, the number of revolutions Np, excitation current If and generated voltage Vb.

Subsequently, the microcomputer 64 calculates a revolution deviation ($\Delta Np$) and an excitation current deviation ($\Delta If$) based on the received data indicative of the generation conditions by using the following formula (step 101):

$$\Delta Np = Np(n) - Np(n-1)$$

$$\Delta If = If(n) - If(n-1)$$

where Np(n) and If(n) indicate the number of revolutions and the excitation current, respectively, included in the currently received data, and Np(n−1) and If(n−1) indicate the number of revolutions and the excitation current, respectively, included in the previously received data.

The microcomputer 64 then determines whether or not an absolute value |ΔNp| of the revolution deviation and an absolute value |ΔIf| of the excitation current deviation are each smaller than predetermined values (predetermined values for the ΔNp and ΔIf are separately set) (step 102). If at least one of the absolute values of the deviations is equal to or more than the predetermined value, negative determination is made, and the microcomputer 64 then calculates for normal generation control conditions (step 105). The normal generation control conditions refer to those various setting conditions for executing various generation controls which have conventionally been performed. For example, the charge/discharge current of the battery 5 measured with the aid of the shunt resistor 50 may be used as a basis for specifying an adjustment voltage value for controlling generated voltage or an adjustment current value for controlling excitation current. Also, for suppressing drastic increase of the generation torque during the idling of the engine 2, load response control (gradual excitation control) may be performed, by which the adjustment current value for controlling the excitation current is increased with the lapse of time so as to gradually increase the driving current. After calculating the normal voltage control conditions, the microcomputer 64 produces the generation-controlling transmitting signals necessary for the generation control corresponding to the conditions, and then transmits the signals to the generation control unit 4 (step 106).

If both of the deviations calculated at step 101 are smaller than the predetermined values, an affirmative determination is made at step 102. In this case, the microcomputer 64 determines whether or not reference value control of the charge current is necessary (step 103). The reference value control refers to giving variability to the amount of generation of the generator 3 and controlling the charge/discharge current of the battery 5 measured at this timing so as to be settled at a predetermined reference value proximate to zero amperes (0 amperes), whereby the offset error contained in the charge/discharge current measured with the aid of the shunt resistor 50 can be determined. In this way, a reference value obtained from a stable-state battery voltage is determined as an offset error, as described later. However, the principle, per se, for measuring the offset error is known.

At step 103, it is determined whether or not the time has come for carrying out the reference value control. For example, the reference value control may be carried out once if an affirmative determination is made at step 102, after turning on the key switch 7 to enable operation of the battery charge/discharge current managing apparatus 6. Alternatively, the reference value control may be carried out at a predetermined interval. Also, the reference value control may be carried out where any change has occurred in monitored various conditions, such as temperature, that may cause variation in the offset error. In case there comes no time for carrying out the reference value control, a negative determination is made at step 103. Then, control proceeds to step 105 to perform the process of calculating the normal generation control conditions, as well as the subsequent processes. When the time has come for carrying out the reference value control, an affirmative determination is made at step 103. The microcomputer 64 then calculates the generation control conditions required for carrying out the reference value control (step 104).

Figure 4:
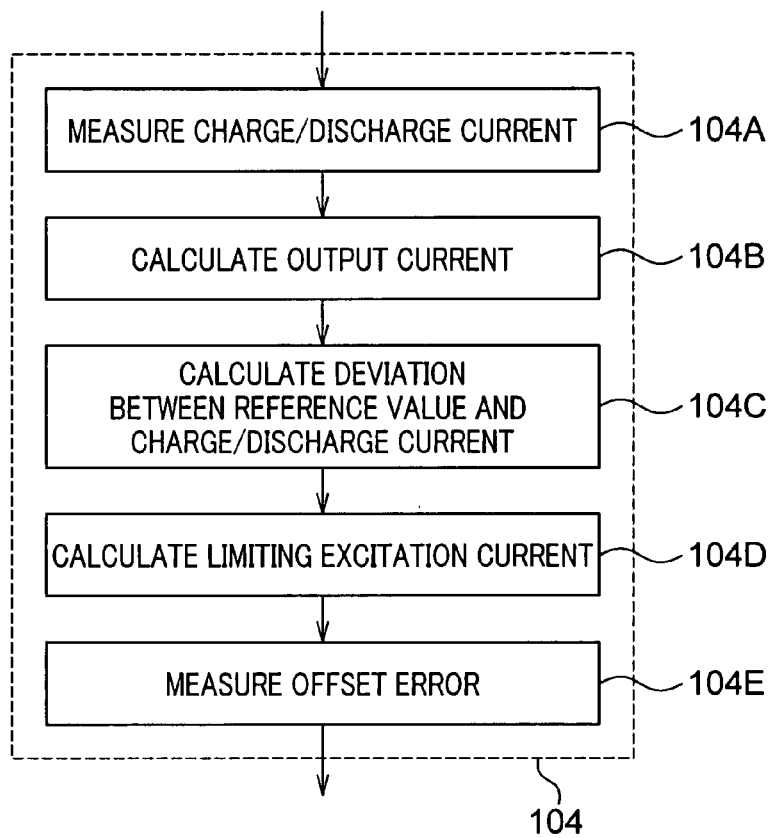
FIG. 4 is a flow diagram illustrating in detail the contents of reference value control.

FIG. 4 is a flow diagram illustrating in detail the reference value control. The microcomputer 64 measures the charge/discharge current, first, of the battery 5 (step 104A). The measurement is performed with the aid of the shunt resistor 50, and the measured charge/discharge current includes an offset error. The microcomputer 64 then calculates an output current of the generator 3 based on the number of revolutions and the excitation current (step 104B), and also calculates a charge/discharge current deviation between the charge/discharge current measured at step 104A and the reference value (step 104C). For example, where the charge/discharge current measured at step 104A is +10 amperes (charge current), the charge/discharge current deviation thereof from the reference value (approx. zero amperes) is +10 amperes. Subsequently, the microcomputer 64 calculates an excitation current required for setting the output current of the generator 3 (this excitation current is hereinafter referred to as a "limiting excitation current"), so that the charge/discharge current deviation may be zeroed (step 104D). For example, where the charge/discharge current deviation is +10 amperes and the output current of the generator 3 at that timing is 90 amperes, reducing the output current to 80 amperes may allow the charge/discharge current deviation to be zeroed to mach the reference value. At step 104D, the limiting excitation current is calculated, which is required for reducing the output current of the generator 3 to 80 amperes.

In the description (on step 104B) provided above, the output current has been calculated based on the number of revolutions and the excitation current. However, in order to raise the precision of calculation, other elements (e.g., generated voltage) may be added.

Figure 5:
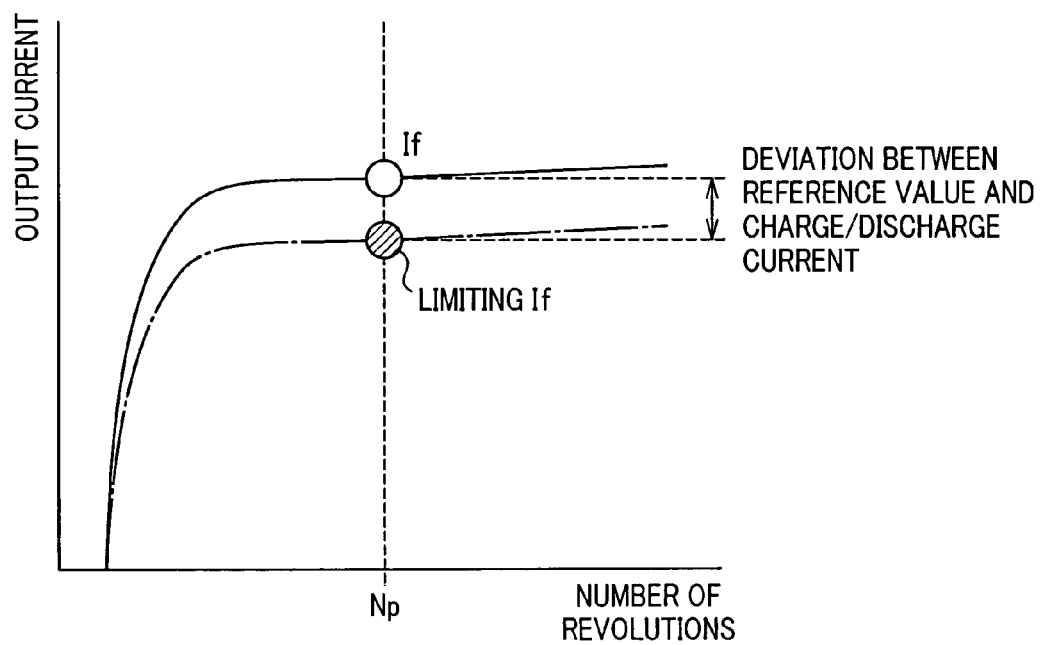
FIG. 5 is an explanatory view of limiting excitation current.

FIG. 5 is an explanatory view of the limiting excitation current (limiting If). In FIG. 5, the solid line indicates the output current in the existing excitation current If. In order to reduce (or increase) this output current by the amount corresponding to the charge/discharge current deviation, the excitation current up to then is changed to the limiting excitation current.

The microcomputer 64, after calculating the generation control conditions necessary for carrying out the reference value control, produces the generation-controlling transmitting signals necessary for the generation control corresponding to the conditions and transmits the signals to the generation control unit 4 (step 106). The charge/discharge current is controlled in this way so as to be settled at the reference value.

In the operation procedures shown in FIGS. 3 and 4, as a precondition for measuring the offset error, the description has been focused on controlling the charge/discharge current so as to be settled at the reference value (approx. zero amperes). In practice, however, subsequent to this control, the output current of the generator is finely adjusted while the battery voltage is monitored, and the charge/discharge current of the battery 5 measured by the known technique at this timing when the battery voltage is finally stabilized is determined as being an offset error at step 104E in FIG. 4. By way of example, the offset error is in a range of 1-2 amperes.

Specifically, controlling the generator 3 so as to obtain the limiting excitation current calculated at step 104D of FIG. 4 may allow the charge/discharge current of the battery 5 measured at that timing to be zeroed. However, since the measurement value includes the offset value (the value is indefinite at this timing), as a matter of fact, a charge/discharge current equivalent to the offset error flows through the battery 5. Therefore, the battery voltage varies with the charge/discharge voltage. The microcomputer 64 monitors the battery voltage to find variation thereof. Where there is variation in the battery voltage, the generation conditions of the generator 3 are controlled depending on the increasing or decreasing variation, so that the output current can be further increased or decreased. When there is finally no variation in the battery voltage, the true value of the charge/discharge current of the battery 5 should substantially be zero (zero amperes) at that timing, and the actually measured charge/discharge current should correspond to the offset error. This is the way that the measurement of the offset error is carried out.

As described above, according to the present embodiment, the microcomputer 64 for controlling the generator provided in the battery charge/discharge current managing apparatus 6 may contribute to remarkably reducing the influences such as of ignition noise caused in the communication associated with the charge/discharge current of the battery 5, made with the microcomputer 64. In particular, the presence of such various noises may necessitate the use of a filter for removing high-frequency components. Use of the filter, however, may become the cause of the occurrence of the offset error. Thus, the remarkable reduction of the noises, as mentioned above, may eliminate the use of the filter, or may allow use of a filter of a simplified structure, leading to the reduction of the offset error, per se. In this way, reduction in the influences of the noises may enable stable measurement of the offset error. At the same time, taking into account of the offset error, high-precision measurement may be enabled for the battery charge/discharge current.

Further, in controlling the charge/discharge current of the battery 5 by the microcomputer 64 so as to be settled at the predetermined reference value, the offset error measurement is performed while the number of revolutions of the generator 3 is stabilized within a predetermined range. Determination of the offset error while the number of revolutions of the generator 3 is stabilized, may prevent the influences brought about by the variation in the amount of generation, which variation occurs with the variation in the number of revolutions of the generator 3. This may lead to determining the offset error with high precision.

Further, in controlling the charge/discharge current of the battery 5 by the microcomputer 64 so as to be settled at the predetermined reference value, the offset error measurement is carried out while the excitation current of the generator 3 is stabilized within a predetermined range. Measurement of the offset error while the excitation current of the generator 3 is stabilized, may prevent the adverse effect of the variation in the amount of generation, which variation occurs with the variation in the excitation current of the generator 3. This may lead to determining the offset error with high precision.

The microcomputer 64 controls the excitation current of the generator 3 to give variability to the output current of the generator 3, so that the charge/discharge current of the battery 5 may be controlled and settled at the predetermined reference value. Controlling the excitation current for the purpose of making the output current of the generator 3 variable, may more stabilize the control for achieving the predetermined reference value, than the conventional technique of controlling the generated voltage for achieving the same purpose. In particular, input impedance of the battery 5 is as small as several milli-ohms, which may unavoidably cause the charge/discharge current to be varied with a small change of the voltage. However, giving variability to the output current of the generator 3 by controlling the excitation current, may allow the control of the charge/discharge current of the battery 5 with more stable manner.

Further, the charge/discharge current of the battery 5 is measured based on the voltage across the ends of a current measuring resistor (shunt resistor 50) which is inserted in series into a path for supplying charge/discharge current of the battery 5. There are other methods for measuring current, including a method for measuring current based on the variation of magnetic field. Comparing with this method, the method using the shunt resistor 50 may not be affected by the terrestrial magnetism. Thus, the adverse effect of the disturbance can be removed to enable determination of an offset error with high precision.

The shunt resistor 50 is connected to a negative terminal of the battery 5. This may enable measurement of the charge/discharge current of the battery 5 with the ground potential as a reference. Accordingly, the battery charge/discharge current managing apparatus 6 as a whole can be operated with the ground potential as a reference, whereby the operation can be stabilized compared with the case of the ground float.

The battery charge/discharge current managing apparatus 6 receives generation condition data of the generator 3 through digital communication. This can eliminate the influences of the ignition noise, for example, so that stable conditions of generation of the generator 3 can be reliably determined. In particular, the time interval for receiving the generation condition data is set at substantially one tenth of the time constant of the rotor of the generator 3. Therefore, the generation conditions of the generator 3 can be detected at a speed sufficiently higher than the change of the generation conditions, leading to more reliable determination on the stable conditions of generation of the generator 3. In addition, the battery charge/discharge current managing apparatus 6 is provided therein with a power source circuit 77 for supplying electric power to internal circuits from the battery 5. Thus, stable operation can be ensured irrespective of the noise that enters from a power source line and irrespective of the voltage variation of the battery 5.

The present invention is not limited to the embodiment described above but may be modified variously within the spirit of the invention. The above description has been mainly focused on the reference value control to provide a precondition for measuring an offset error, and has not particularly described an operation of the control utilizing the measured offset error, but high-precision measurement of the offset error may lead to correct estimation of the battery capacity. This is because the battery capacity is obtained by correcting the measurement value of the charge/discharge current of the battery 5 using the high-precision offset error and by carrying out time integration using this corrected charge/discharge current.

FIG. 6 is a block diagram illustrating a modification of the battery charge/discharge current managing apparatus. A battery charge/discharge current managing apparatus 6A shown in FIG. 6 is different from the battery charge/discharge current managing apparatus 6 shown in FIG. 2 in that the former is additionally provided with a charge capacity storage 78, and other portions of the configuration of the former are basically the same with the latter. After the measurement of the offset error, the microcomputer 64 carries out time integration using a value obtained by subtracting the offset error from the measured charge/discharge current of the battery 5, so that the battery capacity can be estimated. The estimated battery capacity is stored in the charge capacity storage 78. The communication controller 72 then reads out the battery capacity stored in the charge capacity storage 78 to carry out modulation process by converting the read out data into a predetermined format for digital communication. A modulated signal (digitally modulated signal) is transmitted from the driver 70 to the generation control unit 4 and the ECU 1 through the communication line. It should be appreciated that the microcomputer 64 corresponds to the capacity estimating unit. The charge capacity storage 78, the communication controller 72 and the driver 70 correspond to the transmitting unit.

As described above, the battery capacity is estimated by carrying out time integration using the value obtained by subtracting the offset error from the measured charge/discharge current of the battery 5, followed by transmitting the estimated battery capacity to the ECU 1. Thus, elimination of noise influences for determination of an offset error may enable stable and high-precision capacity control based on the current integration.

In the embodiment described above, the description has been provided with an exemplification in which the battery capacity is transmitted through digital communication. However, various modifications may be made. For example, the battery capacity can be transmitted in the form of an analogue quantity, or in the form of an amount of duty for PWM communication.

What is claimed is:

1. An apparatus for managing a charge/discharge current of a battery mounted on a vehicle, comprising:
    a detecting unit that detects an actual amount of the charge/discharge current;
    a receiving unit that receives information indicative of a generating operation of a generator mounted on the vehicle and an excitation current supplied to the generator;
    a control unit that controls the generating operation of the generator so that the charge/discharge current of the battery keeps a given value specified for the charge/discharge current, on the basis of both the detected actual amount of the charge/discharge current and the received information indicative of the generating operation of the generator;
    a determining unit that determines whether or not the number of revolutions of the generator is within a given range of revolutions and whether or not the excitation current is within a given range of the excitation current in a state where the generating operation of the generator is controlled by the control unit; and
    a setting unit that sets, as an amount of offset of the charge/discharge current, a charge/discharge current detected by the detecting unit when it is determined by the determining unit that the number of revolutions of the generator is within the given range of revolutions and the excitation current is within the given range of the excitation current.

2. The apparatus of claim 1, wherein
    the control unit is configured to control the excitation current to the generator to variably control an output current from the generator, based on an error between the actually detected charge/discharge current including the amount of offset and the given value.

3. The apparatus of claim 1, wherein
    the detecting unit comprises a resistor inserted in series in a path through which the charge/discharge current of the battery is supplied and the detecting unit is configured to detect the amount of the charge/discharge current based on a voltage across the resistor.

4. The apparatus of claim 3, wherein
    the battery comprises positive and negative terminals through which the charge/discharge current passes, and
    the resistor is arranged between the negative terminal of the battery and the ground so as to be electrically connected to the negative terminal of the battery and the ground.

5. The apparatus of claim 1, wherein
    the receiving unit is configured to receive the information from an external apparatus on digital communication.

6. The apparatus of claim 5, wherein
    the generator comprises a rotor, and
    the receiving unit is configured to receive the information at intervals which are equal to or less than approximately 1/10 of a time constant of the rotor of the generator.

7. The apparatus of claim 1, further comprising:
    an estimating unit that estimates a capacity of the battery based on the actual amount of the charge/discharge current detected by the detecting unit and the amount of offset of the charge/discharge current set by the setting unit; and
    a transmitting unit that transmits information indicative of the estimated capacity of the battery to an external apparatus.

8. A method for managing a charge/discharge current of a battery mounted on a vehicle, comprising steps of:
    detecting an actual amount of the charge/discharge current;
    receiving information indicative of an generating operation of a generator mounted on the vehicle and an excitation current supplied to the generator;
    controlling the generating operation of the generator so that the charge/discharge current of the battery keeps a given value specified for the charge/discharge current, on the basis of both the detected actual amount of the charge/discharge current and the received information indicative of the generating operation of the generator;
    determining whether or not the number of revolutions of the generator is within a given range of revolutions and whether or not the excitation current is within a given range of the excitation current in a state where the generating operation of the generator is controlled; and
    setting, as an amount of offset of the charge/discharge current, a charge/discharge current detected when it is determined that the number of revolutions of the generator is within the given range of revolutions and the excitation current is within the given range of the excitation current.

* * * * *